United States Patent
Wulkowicz

Patent Number: 5,148,628
Date of Patent: Sep. 22, 1992

[54] IRRIGATION AND PERCOLATION METHOD AND APPARATUS

[76] Inventor: Robert M. Wulkowicz, 2801 W. Eastwood, Chicago, Ill. 60625

[21] Appl. No.: 380,192

[22] Filed: Jul. 14, 1989

[51] Int. Cl.$^5$ ............................................. A01G 29/00
[52] U.S. Cl. ........................................ 47/48.5; 405/36
[58] Field of Search .......................... 47/48.5, 25, 33; 405/36, 68, 51, 115

[56] References Cited

U.S. PATENT DOCUMENTS

| | | | |
|---|---|---|---|
| 2,684,077 | 7/1954 | Shaffer | 47/48.5 |
| 3,134,233 | 5/1964 | Morrison | 405/36 |
| 3,230,967 | 1/1966 | Castro | 405/68 |
| 3,568,453 | 3/1971 | Ziegenmeyer | 405/36 |
| 4,071,974 | 2/1978 | Tripp | 47/32 |
| 4,336,666 | 6/1982 | Caso | 47/25 |
| 4,702,034 | 10/1987 | Ferguson | 47/33 |
| 4,799,821 | 1/1989 | Brodersen | 405/115 |
| 4,890,417 | 1/1990 | Futch | 47/33 |
| 5,030,031 | 7/1991 | Brown | 47/48.5 |

FOREIGN PATENT DOCUMENTS 1165245 7/1985 U.S.S.R. ................................. 405/36

OTHER PUBLICATIONS

Edge-King; Oly-Ola Sales Inc. copy in Jul. 28, 1981 47/33 obtained at a trade show.

Primary Examiner—Henry E. Raduazo

[57] ABSTRACT

A method and apparatus for irrigation comprising a liquid-filled wall of flexible elongated tubing forming the boundaries and sealed containment of a defined and desired area which is then filled with an indicated or desired amount of water for irrigation and, additionally, with materials whose use includes but is not limited to fertilization, disease treatment, or experimentation. The tubing can be used alone as the sealed containment or to provide the transportation means for the irrigation water in addition to the sealed containment. Upon completion of percolation, the tubing is emptied, rolled up, and taken to the next use and location.

17 Claims, 4 Drawing Sheets

IRRIGATION AND PERCOLATION METHOD AND APPARATUS

BACKGROUND OF THE INVENTION

This invention relates to the irrigation, feeding, and disease treatment/control of individual plants and trees, and as well to different combinations of planting rows, groves, or mixed planting areas of many types.

It has been long recognized that the health of large plantings, landscapes, and trees is always threatened by profound shortages of rain. Many trees die during such periods. Many more are seriously weakened, their lives shortened, and they are much more vulnerable to insects and diseases.

Traditional techniques and prior art are not up to the enormous tasks of watering and irrigating these many millions of national assets adequately during periods of severe drought. A single large tree may transpire many hundreds of gallons a day in moving water up from the ground and out through its leaves. For the numbers of trees involved in many different settings, to replenish these amounts efficiently and frugally seems impossible and many private owners, public parks, and communities can only watch and wait for rain.

Those that try to save their trees and plantings have been essentially limited to the traditional methods of watering that include irrigation by sprinkler or similar spraying systems, hose and surface irrigation, and deep root watering. These prior art techniques all have drawbacks and inefficiencies made manifest in various ways.

Watering by sprinkles usually includes a certain percentage of evaporative loss, often significant, as well as a problem of control of the spray patterns that, on a windy day for example, would result in the water spray drifting over unwanted sections or over covered areas that lead to gutters and drains. Either permanent or temporary installations require piping and maintenance and all installations are sensitive to and dependent on supplied water pressure. Any higher efficiency methods usually used for crops demand large open areas found only in farmland.

Where garden and water hoses are simply laid down and allowed to spread water on the surface near tree trunks and plantings, success is all too often dependent on the slope or grade of the surrounding ground, and excessive runoff into unwanted areas is quite common.

Watering from the top down by these two methods is even more difficult when the ground is compacted, desiccated, and unable to easily absorb water. The problems of wasteful runoff is then magnified, and the tasks become more frustrating.

For either method, the distances covered and the sizes and weights of the hoses that could be handled in the oppressive heat also severely limit the possible coverage and water quantities. Larger hoses can deliver more volume, but then the weight of the hoses requires a truck to help drag those lengths from place to place. So, the compromise of the length and size of the hoses that recognizes and reduces strain and injury to the workers, along with the other logistics of site accessibility and location of water sources, then predetermines the available gallons for irrigation. It will take many hours with smaller hoses to adequately water only a few trees, even without the problems of runoff and evaporation.

Deep root watering has also been used, which is the drilling and injection of water directly into the ground at pressures of 30 psi or more, under the theory that the pressures would "crack" the soil structure and allow the water to diffuse throughout the ground. However, these hollow spikes are more often driven below the actual levels of most of the water-absorptive root systems (the first 6 to 24 inches of soil) and the injected water might not be available to the trees or other plantings because of a kind of "subterranean" runoff. And even this system, which attempts to avoid the problems of the first two methods by being specific and focused in its applications, usually uses only relatively small quantities of water (from 30 to 50 gallons per tree) and is very labor and equipment intensive.

It appears to the inventor that these commonly accepted gallon numbers are as much a product of our admitted inability to supply larger quantities of water as of any real analysis of the actual needs of large and mature trees and plantings. Since we cannot supply, and have never before been expected to supply water to trees and plantings that seemed able to fend for themselves, we innocently lower volume standards and application techniques that might not reflect the true requirements of trees and plantings in crisis.

The absorptive root system of almost all trees is spread out roughly analogous to the extent and circumference of their leafy superstructure, called the crown, and out many feet to the distant edge of the crown, called the drip line. The numerous surfaces of the leaves can catch, slow down, and then drop available rain water easily into this root area. These same roots also provide the structural counterbalance to the aboveground parts of the tree that are heavy with leaves, cantilevered, and subjected to repeated and severe wind stresses. It is reasonable to expect that supplying water to this entire area, and not just near the tree trunk where there are more structural and fewer absorptive roots, and in the quantities of water that are actually recorded as used by the trees, would be the best, most efficient and effective standard of drought irrigation. However, when this intervention is attempted using prior art, the number of trees that could be watered is severely limited.

Two newer methods, drip irrigation and porous buried hoses, that deposit small amounts of water continuously near the root zone, either do not supply the quantities of water needed for large and mature plantings and trees, or require expensive retrofit installations in areas never designed for or expected to require watering.

This present invention also differs significantly from other prior art that may be considered similar in appearance or in similar fields as shown the patents of Nail (U.S. Pat. No. 3,001,207) describing a wading pool; Landry (U.S. Pat. No. 3,808,831) showing a skating rink; Vickery (U.S. Pat. No. 3,933,002) also showing a skating rink; de Pous (U.S. Pat. No. 4,335,473) describing water reservoirs, particularly swimming pools; and Eymard (U.S. Pat. No. 4,597,113) showing an inflatable reservoir for containing a liquid, especially an inflatable swimming pool.

Nail's invention is air inflatable—rising to float on rather than contain any water, it is also required to be of a specific diameter, and has bottom flaps intended to be leak proof. Landry's and Vickery's teachings are limited to ice skating rinks wherein the tubular wall is filled with a rigid material of either frozen water or formed-in-place plastic foam and thus provides a support system for a plastic sheet that is either clipped or integrally fastened, and intended only to hold or contain water. If the sheet in Vickery, or the flaps in Nail, were to be removed, the rigid quality or the weightlessness of the respective walls would not prevent runoff losses and any such runoff water could of course not be available to percolate into the desired area. In Laudry, de Pous, and Eymard, the inventions are essentially one piece containments that could not easily be pierced or placed around a tree without being split and thus destroying the integrity and purpose of the inventions. In addition, the remaining floor covering of the now split inventions could only inhibit any desired percolation of the irrigation water.

Additional prior art having to do with some type of control of water dam, Serota (U.S. Pat. No. 3,213,628) describing a water filled plastic dam structure; Guazinotti (U.S. Pat. No. 3,855,800) with an inflatable barrier for watercourses; Fish (U.S. Pat. No. 4,136,995) showing a portable dam; Muramatsu (U.S. Pat. No. 4,330,224) describing a collapsible rubber dam; Wagner et al. (U.S. Pat. No. 4,362,433) showing a flood disaster bag; and Muramatsu (U.S. Pat. No. 4,498,810) again with a collapsible rubber dam.

Serota offers a plurality of filled containers stacked horizontally to be used like bricks in a construction for damming a watercourse. Even if reduced in scale, they would not provide the same continuity of sealing and would be time consuming in emptying to avoid handling the weight during the repeated transit of our applications. Guazinotti contemplates a filled diverter that is used in controlling or preventing erosion in a watercourse and whose improvements are anchors and fastening techniques to deal with the watercourse's dynamic energies. Fish's portable dam offers a combination of posts as a backdrop to fabric to deal with the forces of a waterway and has no inflatable elements. Both Muramatsu inventions teach in other areas and involve the raising and lowering of a collapsible dam for rivers wherein the dam height is controlled by an improved positioning of supply and discharge conduits with check valves. Wagner contemplates individual inflatable and linkable flood or barrier bags with clips, rings and fill valves that teach away from the simplicity and improved sealing and containment qualities of the present invention.

In brief review, prior art in common use today faces many problems: Evaporation and runoff; restrictive inside diameters and weight of hoses; long distances to traverse and adequacy or availability of water sources; and significant time, strength, and stamina requirements for personnel under difficult working conditions.

An important number of these problems have been addressed and obviated in a novel manner by the present invention, which additionally allows the supply and accurate placement of large quantities of water in a significantly frugal and conservation-oriented fashion that is now more critically important than ever in a nation faced with dwindling water resources and periodic seriously adverse weather conditions.

SUMMARY OF THE INVENTION

The present invention comprises an elongated thin-walled liquid-inflatable tubular element of sufficient flexibility after being at least partially filled with liquid to adapt and shape itself to ground contours or variations, and of a sufficient weight to create an effective bottom seal and an effective height as a dam or retaining wall which can then be placed to form a linear segment, or to be brought back onto itself as a closed contour. Each placement of the tubular element can be of any length, configuration, or size. The dam thus formed retains an additional, and separate liquid such as water inside a chosen area. This allows the same liquid to percolate or soak into and be absorbed by the soil or ground area for the benefit of trees and plant stock whose roots are contained in that same chosen area.

The height of the liquid contained in the defined dammed area can be varied to duplicate and substitute for the inches of unreceived rainfall usually recorded in that area, or may be altered to any depth and/or soluble composition that meets the needs and objectives of the user.

ADVANTAGES OF THIS INVENTION

The present invention reduces the exposure to evaporation, minimizes any potential runoff because of grade, slope, ground contours, or unevenness, and accurately places large quantities of water in the desired zones and areas that contain the highest percentages of absorptive root structures. The invention also is used for rapid irrigation on hills or slopes that have heretofore presented major difficulties to watering.

The invention provides an inexpensive, lightweight, portable system that can be quickly set up and relocated to reduce the time spent at each site, thus maximizing the number of irrigated locations finished in the course of a workday.

The invention allows the use of various options for water supply and transport that best fit the situation and the invention flexibly uses existing resources of labor and material. The invention can be simultaneously be used as both the hose transport system and the dam.

The invention eliminates much of the use of heavy and unwidely equipment that fatigues users and employees, and subjects them to strain and operational or work-related injuries.

The invention prepares the desired irrigated area for any subsequent natural rain of any intensity or duration by softening and moistening the surface and lower levels, which enhances percolation and minimizes the runoff invariably found in adjacent unirrigated areas.

The invention allows the feeding and treatment of trees and plants with substances, chemicals, and materials on a basis that is economical and focused in application and can be efficiently and simultaneously done with the act of watering.

The invention aids research and experimentation in arborculture and horticulture by allowing comparative testing and evaluations on sections of a single tree in addition to groups of trees.

Other advantages will become apparent from the narrative, description, and preferred embodiment in conjunction with the drawings.

DETAILED DESCRIPTION OF THE DRAWINGS

DESCRIPTION OF THE INVENTION

Figure 1A:
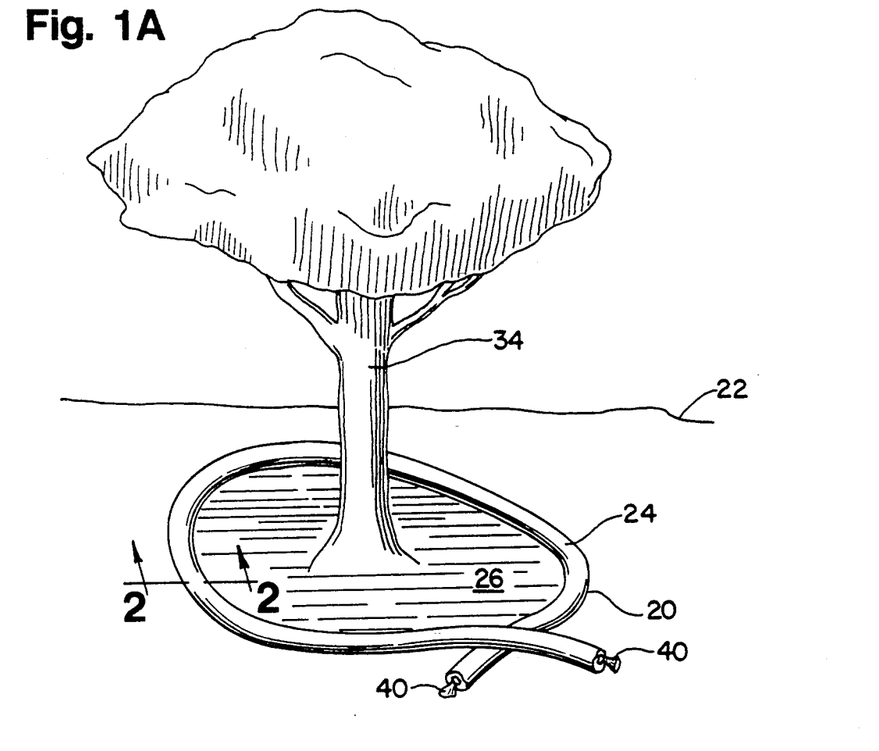
FIG. 1A shows the apparatus of this invention in a perspective view and encircling the desired area around a subject tree with closing knots placed in each end of the tubular element of the apparatus with an excess length of each end portion overlying each other to form a seal at the junction of the ends.
Figure 1B:
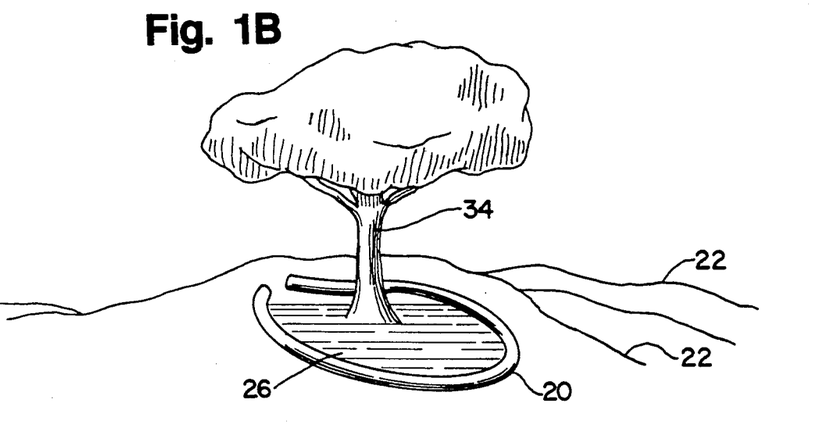
FIG. 1B shows a similar encirclement taking advantage of a high spot in the ground level that obviates a need for a complete closure of the tubing at that point.

The present invention, as illustrated in FIG. 1, comprises an elongated thin-walled liquid-inflatable tube 20 that has sufficient flexibility and weight to shape itself to ground contours or variations 22 when filled with a liquid such as water 24 and can thus form an effective seal or dam that may be shaped as a single segment or brought back onto itself for closure in order to restrain or contain additional irrigation water 26 inside a defined and desired area 4—4 and to allow the percolation and absorption into the soil or ground area for the benefit of trees and plant stock whose roots 30 are contained in that same desired area.

The tubing 20, which in the preferred embodiment is 6 or 8 mil plastic and approximately 6 to 14 inches in diameter, is usually manufactured and delivered in rolls and can be laid in place by simply walking the perimeter distances desired while unrolling the tubing as one goes. For an individual tree 34, a reasonable rule of thumb would be to walk a rough circle, laying out the tubing 20 in a line directly under the outside edge of the leafy cover of the tree, and bringing the tubing circle back onto itself. This encircled area 4—4 now overlies most of the water-absorbing root structure zones 32 of most trees. Please note that it is not necessarily required that the enclosed area be a circle; the layout of the tubing 20 may be turned to avoid an obstacle, or extended to include, for example, another nearby tree or planting.

In one embodiment of the apparatus of the invention, one end of the tubing 20 is then positively sealed, perhaps with a device or clip, but again preferably with a simple knot 40, given the thin wall 28 and flexibility of the tubing. This choice of barrier against leakage also is preferable in that there are no extra parts to keep track of or lose.

After filling the tubing with water through the open end, this end is then sealed with another knot 40 or positive closure. However, the tubing 20 does not necessarily have to be filled to its full round diameter to be successful as a dam because any slope, grade, depression, or elevation of the ground surface will cause the level of water in the tubing to automatically compensate for any reasonable variations that are not too large. It will still provide a dam height at any given point that is substantially the same height above any ponded water as long as the water 24 in the tubing 20 is continuously connected. The tubing in a lower ground section will have more water 24 collecting in it at that point and will face and restrain the greater quantity of collected ponded water 26 at that same lowered area. This automatic adjustment is clearly superior to any attempt to use a cumbersome and vertically inflexible dam material such as a sheet of plastic edging or sheet metal requiring a continuous edge to be driven into the soil for sealing purposes yet which could not retain water 26 above the top edge of the material if its height were less than the depth of the lowest point of the contained circle.

The weight of the water in the tubing 20 as gallons per foot is significant and the sealing quality of the weighted tubing effectively slows or stops any water losses over the ground 22 from beneath the tubing, therefore minimizing or eliminating any runoff possibilities. The wetting of the soil material beneath the tubing 20 during filling and percolation actually creates a better seal as the heavy tubing presses into the softening ground.

Figure 3:
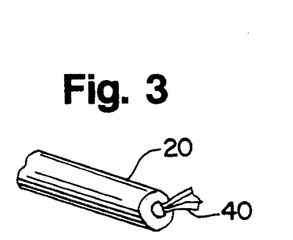
FIG. 3 shows the tubing junction shown in FIG. 1A where the two closed ends of the tubing meet and are then progressively folded over each other to form an effective seal against leakage at the point of junction.
Figure 3A:
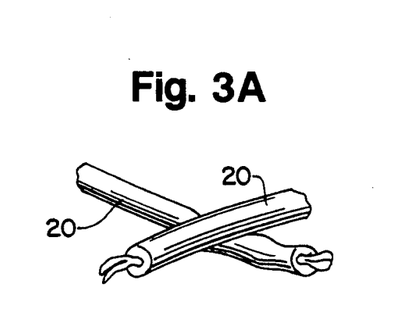
Figure 3B:
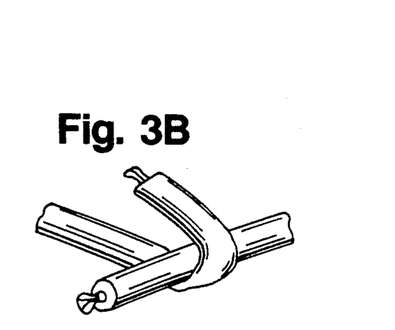
Figure 3C:
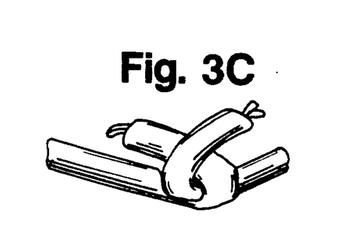

Closure at the junction 6—6 of the two ends of the tubing 20 is easily accomplished, as shown in the progression drawings of FIG. 3, by laying one end right on top of another and then folding the tubing back again on itself, thereby doubling the weight pressing the tubing to the ground at that section. Equally effective, if there are some discernable changes in height at the desired area of encirclement, is to select starting and stopping the layout of the tubing 20 at some high spot so that when the ends meet they probably will not even need to be joined if the water level of planned ponding depth will not get up to that point. Much like a golfer planning a putting shot on a green, the user of the present invention quickly and naturally learns to evaluate the terrain and choose the best combinations of ease of installation, efficient coverage and best benefit to the subject tree.

The percolation dam is now complete and the user may elect to move on to a next site to place more dams as a part of a "coordinated assembly line" process. Here at this location, all that is left to do is to fill the walled pool site with water 26 to any depth desired. A small tree, with a small enclosed area, will obviously require proportionally less water than a larger tree with a much greater enclosed diameter if both are filled to the same depth.

That planned height of the water 26 contained in the dammed area can now be adjusted for different reasons. For example, in matching the inches of depth in the dammed area to the inches of the shortfall in rain for a given period, a simple, common sense allocation of irrigation can be made by relatively unskilled people that provides adequate water replenishment without the dangers and wastefulness of overwatering. If the available water resources cannot provide those quantities, or if the time or cost required to bring water to the sites presents a problem, then the depth of ponding can be scaled down to fit those limitations. Judgments of efficiency and economy for the irrigation operations are continually available.

The irrigation water 26 is now left for whatever time necessary to break down the resistance of the compacted or desicated soil 23 to percolation and absorption. This soaking pool is unattended after the initial filling of the desired area and other tasks may be done here or elsewhere during this period. The absorbed water will be then stored directly underneath the desired area to a depth and with a minimal lateral spread that is determined by both the head pressure of the ponded water and the structure and composition of the soil and is illustrated in FIG. 3 showing the edge of percolation 36. After soaking, this wetted soil zone 38 is now much more receptive to the next exposure to water and will more easily accept infiltration from a succeeding rain that might ordinarily have simply run off the parched soil and been effectively unavailable to the root structure of the tree or planting.

When the percolation is complete, the tubing is unknotted, or unclipped, and drained right there at the site, leaving the last of that water at the same location where it was first needed. The empty tubing 20 is now simply rolled up into a lightweight and portable package that can be reused many times again for the same operation elsewhere. It is no longer necessary to drag heavy water-filled rubber and plastic hoses with the subsequent fatigue and risk of strain or injury.

The ratio of water 24 necessary to fill the tubing 20 is small indeed compared to the amount of water 26 that can be contained and held for the benefit of the tree. In the first uses, the percolation dams were set in place and the tubings filled by a separate crew with a portable water supply. Soon thereafter, dump trucks, adapted and filled with water, deposited between 100 and 1200 gallons of water at each successive liquid dam, depending on the size of the dam, to a desired depth that matched the recorded rain shortfall. The fill time was reduced to minutes.

It is agreed that these quantities are significantly higher than the ones usually quoted for watering trees, but they are justified by the recorded amounts that the subject trees would have received under normal conditions and they also anticipate a continued drought situation for perhaps days or weeks ahead. The subject trees have now been precisely irrigated in reasonable proportions to their individual needs. This was accomplished essentially without surface runoff or waste. Also, the potential evaporative losses were eliminated since no spraying or sprinkler use was involved and only a minimal time was required for percolation.

The invention allows any mixture of soluble fertilizer, chemical treatment, or disease control can be added to the water 26 that is ponded by the method which can then absorbed evenly by the tree or planting if the confined area 4—4 includes the majority of the root structures of the subject.

Figure 4:
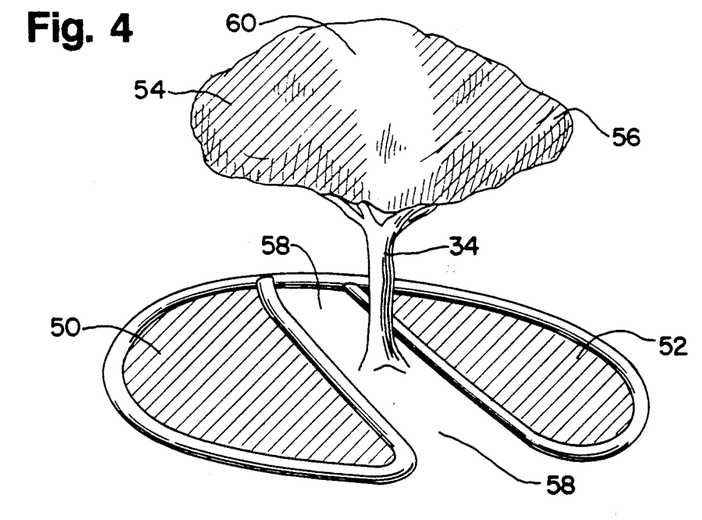
FIG. 4 illustrates the embodiment used to divide the root zone of a tree into separate sections that can treated differently for various reasons of experimentation, research, and health maintenance.

Also, in experimentation and research, for example, it is possible to isolate arc segments or any desired sections of root structures via the new apparatus and method as shown in FIG. 4 and treat those sections in various ways which will be reflected by solute uptake in the crown structure 35, or leafy branch part above ground, of the subject. Here, the root zone 32 of the tree 34 have been divided into three areas by the tubing 20; a first dammed area 50, a second dammed area 52, and a third undammed area 58. Because the root zone of the tree 34 is roughly analogous in its radial spread to the radial spread of the crown 35, there will be a roughly corresponding uptake of dissolved materials in the irrigation water 26 from roots 32 to crown 35. Root area 50 is reflected in crown area 54, root area 52 is reflected in crown area 56, and the isolation zone 58 is reflected in crown area 60.

The dry isolation zone between the two wet zones with their edges of percolation 36 helps provide further separation of possible analyzable reactions in the crown 35 from the uptake of different materials in the different root zones. Adding different dissolved substances to 50 and 52, or to more dammed sub areas or divisions if desired, will allow the study of the effects of the substances on the respective portion of the tree. While this descriptive section is exaggerated in its simplicity for sake of explanation, and there are problems, for example, of crossover roots that migrate from zone to zone or the potential of lateral diffusion in the body of the tree, it is clear that there is great merit in the further investigation and research that the present invention will afford. Comparative studies of various substances will be able to be better done on different sections of the same tree and afford additional research improvements to the usual practices of testing various substances on separate subjects called "identical" because they belong to the same sub-species of trees.

Figure 5:
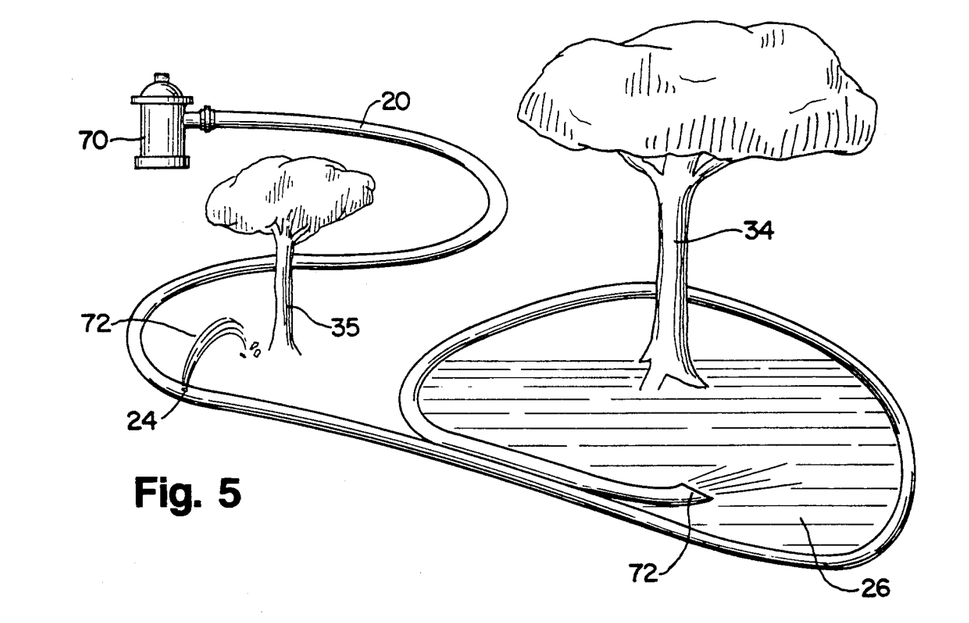
FIG. 5 shows the dynamic embodiment of the apparatus in which the tubing provides both the transit means and the containment means as water continuously flows through the tubing, creating the dam as it inflates the tubing and is eventually discharged into the desired area.

At those locations which are common in urban areas where a water source such as a fire hydrant is available, in another embodiment of the invention shown in FIG. 5, parts of the same tubing can be used for containment of the water and for the transportation means of the water. Here, the tubing 20 is placed directly on the threaded outlet of the hydrant 70 or coupled to a specially designed transition fitting, run out some 300 or 400 feet away, laid out in a desired shape as a containment dam, then brought back to lay adjacent to or against itself and discharge the water 26 into the dammed area.

Figure 2:
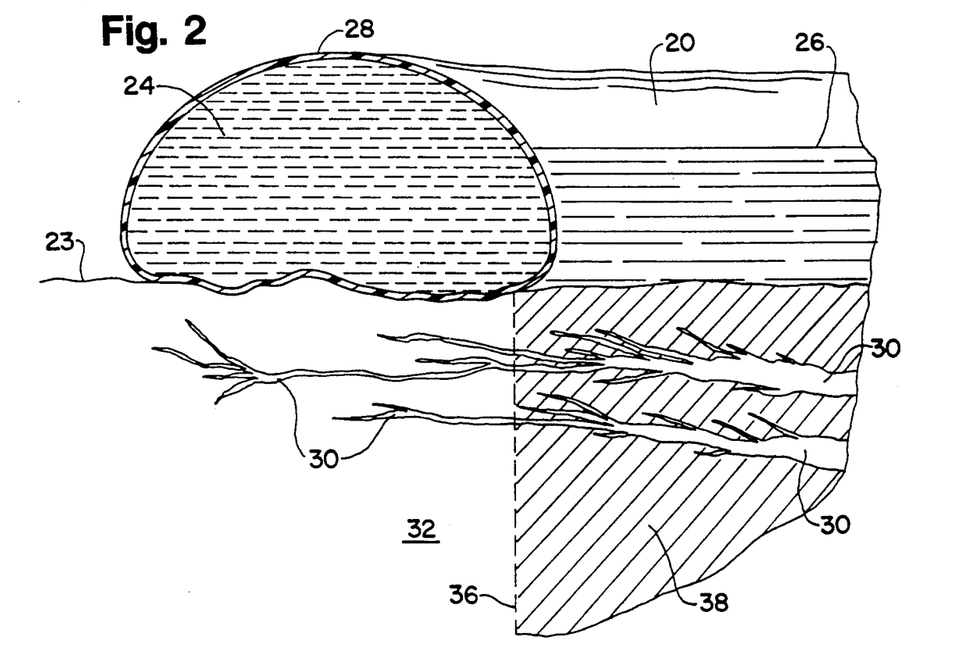
FIG. 2 shows the apparatus of this invention in a cross-section view along lines 2—2 in FIG. 1 with the tubular element, maintained in shape by inflating liquid, supported by the ground, and containing or restraining soaking water for irrigation.

In FIG. 2, the water 22 inside the closed and sealed tubing 20 is separated from the irrigation water 26 and joins it only if there are leaks. Please note that at the open end of the tubing 20 in FIG. 5, there is a transition point 72 where water 22 simply becomes water 26.

As shown in FIG. 5, the same water is transported inside the tubing, thereby providing the necessary weight for sealing, performing the same damming functions, and then discharging into the desired area. Now, in this embodiment, it is possible to move some hundreds of gallons per minute easily off into a park through thin tubing without any splices or additional support, and once there, surround and irrigate an entire grove of trees—with no water loss to streets, gutters, and other unwanted areas.

Surprisingly, it has been found that this thin plastic tubing 20 can be successfully fed from a fire hydrant that is usually connected to heavy canvas hoses and high pressure pumpers, and this operation can be routinely practiced with few leaks and great success in moving tremendous quantities of water. The invention here utilizes the fact that if the tubing is kept open and unrestricted, the pressures seen by the tubing wall 28 are considerably lower than the service pressure of the hydrant 70. As the tubing is restricted, the pressure will then increase to the source pressure and the tubing will finally burst, but if restrictions are avoided, the tubing will carry many gallons per minute to an irrigation location and discharge it comparatively gently at the transition point 72 with little erosive effect.

This relatively low pressure utilization, is much like the static embodiment of FIG. 1, which sees essentially the weight of the water 24, is inside the pressure capabilities of the tubing 20, and usually means that leaks or punctures can be quickly repaired with ordinary label tape.

It is not unreasonable, therefore, in the dynamic embodiment shown in FIG. 5, to choose to poke a small temporary hole in the tubing as it moves water past an individual tree 35 or two on the tubing's way to a further dam. This part of the illustration is not meant to be whimsical, the new small fountain 72 will successfully irrigate those trees as well in the course of the larger, more distant irrigation. It represents no great diversion considering the many gallons per minute it is now possible to move in this embodiment, and is quite in keeping with the task of providing water to as many plantings as possible simultaneously under our drought efforts. The simple tape repair eliminates any water waste in an unwanted area in the next utilization.

In yet another embodiment as illustrated in FIG. 6, the present invention was used to irrigate trees and plantings on slopes 80 so steep, with runoff problems so great, that the only prior art usually considered was injection watering, and that was often so difficult that the sites were effectively ignored. These trees especially were in serious stress and crisis during the drought, and the highway landscapes and contoured parks that contained them faced severe losses.

Figure 6A:
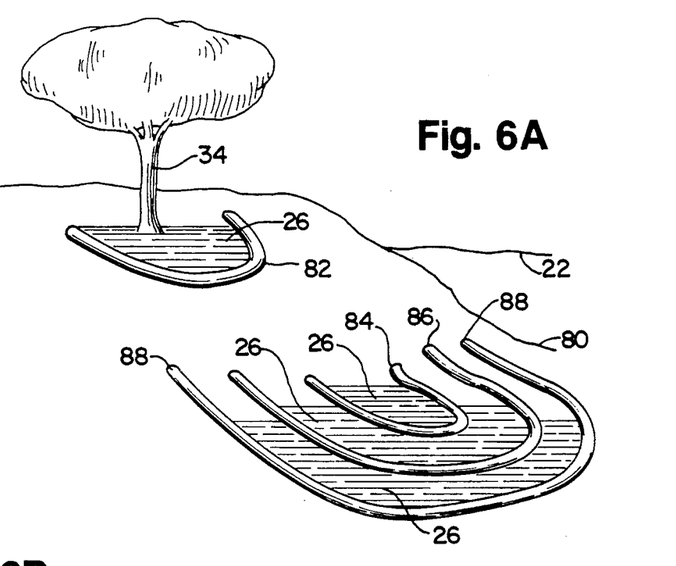
FIG. 6A shows the embodiment of the apparatus on a sloped surface.
Figure 6B:
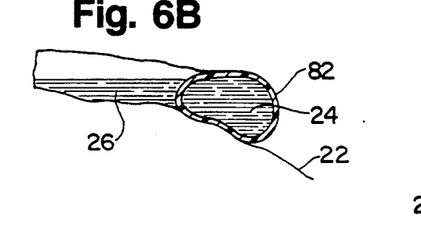
FIG. 6B shows the cross section of a single tubing placement on a slope.
Figure 6C:
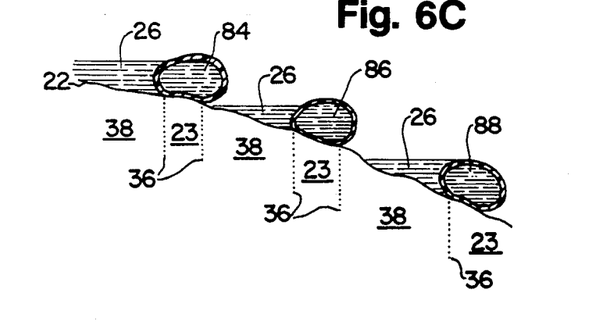
FIG. 6C show the cross section of a plurality of tubing segments acting in concert on a slope to provide a larger irrigation area.
Figure 6D:
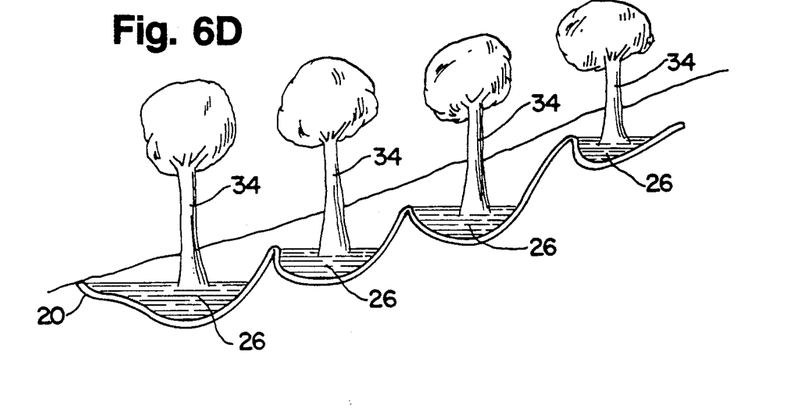
FIG. 6D shows a scalloped variation embodiment that uses a single long tubing segment.

Here, the tubing 20 is anchored at each end in a part of a curve, ranging from a gentle curve 82 to a substantial parabola 84 that reflected the steepness of the slope, and forms a temporary terrace that the water can then dam against, holding the water in place while it is absorbed by the soil. More saturation can be obtained by forming a series of dammed pools with terraces 84, 86, 88 as needed for a particular subject tree or planting area. The illustration in FIG. 6C shows the plurality of tubular elements acting in coordination to provide a much broader wetting of the desiccated soil 23 as the edges of percolation 36 join beneath the surface.

This is the simplest and quickest method of substantial irrigation on these slopes, and in an actual situation, competed successfully with a fireboat and a five-man crew that drenched similar areas with water cannons. Since in that situation the ground was parched and unabsorptive, the runoff from the cannons was significant and wasteful; with this embodiment of the present invention, the tubing terraces simply held the water for eventual absorption while the tubing crew continued at other productive duties.

In this embodiment, it will be seen that each curved segment such as tubular elements 82, 84, 86 or 88 has a concave side that is disposed on the downhill sloped ground surface at a higher level than the corresponding opposite side of the segments. The concave side thus faces uphill and is operative to confine the dammed water against flowing down away from the tree being irrigated.

In still another embodiment in FIG. 6, to fit another configuration of trees on a slope, a long length of tubing 20 can be arranged in a scalloped fashion with each successive scallop lower than the previous so that an individual scallop holds water as a terraced segment, and when it is filled, will spill over into the next scallop, and so on. This can be accomplished rather quickly and illustrates the flexibility of the present invention.

While the present invention has been described above, and illustrated in the accompanying drawings, in connection with the best mode presently contemplated by the inventor for carrying out his invention, the preferred embodiment described and shown is for illustration purposes only, and is not to be construed as constituting any limitation of the invention. Modifications will be obvious to those skilled in the art, and all modifications that do not depart from the spirit of the invention are intended to be included within the scope of the appended claims.

Accordingly, I claim:

1. A method of forming a soaking pool for trees or other plants which comprises:
    (a) positioning an elongated, flexible, thin-walled, liquid-inflatable tube on the ground, spaced from the tree or plant that is to be soaked;
    (b) said tube substantially encircling said trees or plants being irrigated;
    (c) at least partially filling said tube with liquid to form a walled pool site;
    (d) filling said walled pool site with water;
    (d) after substantially all said water in the soaking pool thus formed has soaked into said ground, draining said liquid from said tube; and
    (e) removing said tube for re-use around a second tree or plant.

2. The method of claim 1 wherein said tube comprises a length of tube having two ends and said tube is open at both ends, said method including the further steps of closing one of said ends to provide a barrier against said liquid flowing out of said tube, and flowing liquid into other end of said tube.

3. The method of claim 2 including the further steps of closing said other end of said tube after said tube has been filled with enough said liquid to form a soaking pool.

4. The method of claim 3 including the further steps wherein portions of said tube at each end thereof are folded back upon each other to confine said water introduced into said walled pool site.

5. The method of claim 4 in which said tube is positioned to substantially encircle a tree or plant being irrigated by a plurality of divisions of different desired areas for the placement of separate admixtures and dissolved materials.

6. The method of claim 1 wherein said tube comprises a length of tube having two ends and said tube is open at both ends, said method including the further steps of introducing said water into one end of said tube and allowing it to continuously flow out the other end, said other end being brought back into said encirclement of said walled pool site, said method forming said walled pool site while supplying said water to fill said walled pool site.

7. The method of claim 3 in which said tube is positioned to form a curved segment having a concave side, selected from the group of an individual curved segment and a plurality of said curved segments being located on a sloping surface downhill of said tree or plant being irrigated, with said concave side of said curved segments facing uphill.

8. The method of claim 6 in which said tube is positioned to form a plurality of curved segment having a concave side, said curved segments being located on a sloping surface downhill of said tree or plant being irrigated, with said concave sides of said plurality of segments facing uphill and said tube forming said curved segments while supplying said water to the area comprising said plurality of curved segments.

9. An irrigation reservoir apparatus for trees and other plants, which comprises:
    (a) an area of ground adjacent said plant adapted for forming a reservoir area, (b) an elongated, flexible, thin-walled, liquid-inflatable tubular element, said tubular element of a finite length having a first end and a second end, said tubular element being made of a material as pliant means that is sufficiently limp to permit said tubular element to follow the contours and variations of said area of ground when filled with liquid, said tubular element being positioned on said area of ground as enclosure means for said reservoir area, (c) first means provided at said first end and adapted for communication with a source of liquid, and (d) second means remote from said first means permitting water flow out of said tubular element and into said reservoir area.

10. An irrigation reservoir as in claim 9 wherein said first means is sealable after said water in said tubular element and said reservoir has reached a predetermined level.

11. An irrigation reservoir as in claim 9 wherein said second means comprises perforations permitting said water to flow from said tubular element into said reservoir area.

12. An irrigation reservoir as in claim 9 wherein said tubular element is deployed as forming means for a shaped area substantially encircling said trees or plants being irrigated, and wherein water is introduced as selected said second means for filling said tubular element and said reservoir area as means of containment for a soaking pool that substantially surrounds said trees or plants being irrigated.

13. An irrigation reservoir as in claim 12 wherein said first and second ends are positively sealed as closure means against the flow of said liquid out of said tubular element after said tubular element is at least partially filled with said liquid.

14. An irrigation reservoir as in claim 13 wherein said first end and said second end of said tubular element are folded back where said ends meet said tubular element as means for closing said defined reservoir area and as sealing means against the flow of said water introduced by said second means from beneath said tubular element at the point of junction of said ends.

15. An irrigation reservoir as in claim 9 wherein said second end of said tubular element is left open as selected said second means to permit said water to be continuously introduced by first means into said first end to keep said tubular element at least partially inflated, said water thus introduced then flowing out of said second end into said reservoir pool of said water contained within said reservoir area bounded by said tubular element.

16. The irrigation reservoir of claim 15 in which a plurality of perforations including said second end of said tubular element are left open to permit said water to be continuously introduced as selected said first means into said first end to keep said tubular element at least partially inflated, said water thus introduced then flowing out of said perforations en route as irrigating means for individual trees and plants as well as into said reservoir pool of said water contained within said irrigation reservoir area bounded by said tubular element.

17. The irrigation reservoir of claim 9 in which a curved segment of said tubular element has a concave side, said curved element being disposed with said concave side at a higher level than the corresponding opposite side of said curved segment.

* * * * *